US008631272B2

(12) United States Patent
Prabhakaran et al.

(10) Patent No.: US 8,631,272 B2
(45) Date of Patent: Jan. 14, 2014

(54) DUPLICATE-AWARE DISK ARRAYS (75) Inventors: Vijayan Prabhakaran, Sunnyvale, CA (US); Yiying Zhang, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 13/040,277

(22) Filed: Mar. 4, 2011

(65) Prior Publication Data
US 2012/0226936 A1    Sep. 6, 2012

(51) Int. Cl.
*G06F 7/06*    (2006.01)
(52) U.S. Cl.
USPC ............ 714/6.23; 714/6.2; 714/6.22; 710/114
(58) Field of Classification Search
USPC .................................. 714/6.22, 6.23
See application file for complete search history.

(56) References Cited

U.S. PATENT DOCUMENTS

| | | | |
|---|---|---|---|
| 5,632,012 A | 5/1997 | Belsan et al. | |
| 6,425,052 B1 | 7/2002 | Hashemi | |
| 6,711,649 B1 | 3/2004 | Bachmat et al. | |
| 7,017,107 B2 | 3/2006 | Talagala et al. | |
| 7,043,604 B2 | 5/2006 | Ogasawara et al. | |
| 7,698,591 B2 | 4/2010 | Zohar et al. | |
| 8,301,634 B2 * | 10/2012 | Meadway et al. | 707/740 |
| 2002/0124137 A1 | 9/2002 | Ulrich et al. | |
| 2004/0049632 A1 * | 3/2004 | Chang et al. | 711/114 |
| 2004/0064600 A1 * | 4/2004 | Lee et al. | 710/22 |
| 2004/0205387 A1 * | 10/2004 | Kleiman et al. | 714/6 |
| 2006/0122963 A1 * | 6/2006 | Klein et al. | 707/2 |
| 2006/0218199 A1 | 9/2006 | Kishi | |
| 2008/0005141 A1 * | 1/2008 | Zheng et al. | 707/101 |
| 2008/0148004 A1 * | 6/2008 | Iren et al. | 711/170 |
| 2009/0198749 A1 * | 8/2009 | Barzilai et al. | 707/204 |
| 2009/0235104 A1 * | 9/2009 | Fung | 713/324 |
| 2010/0095375 A1 * | 4/2010 | Krishnamurthy et al. | 726/22 |
| 2010/0325500 A1 * | 12/2010 | Bashir et al. | 714/746 |
| 2011/0107052 A1 * | 5/2011 | Narayanasamy | 711/171 |
| 2012/0059827 A1 * | 3/2012 | Brittain et al. | 707/741 |

OTHER PUBLICATIONS

Aerts, et al., "Random duplicate storage strategies for load balancing in multimedia servers", Retrieved at<<http://citeseerx.ist.psu.edu/viewdoc/download?doi=10.1.1.23.5110&rep=rep1&type=pdf>>, 2000, pp. 9.

Akyurek, et al., "Adaptive Block Rearrangement under UNIX", Retrieved at<<http://citeseerx.ist.psu.edu/viewdoc/download-?doi=10.1.1.47.623&rep=rep1&type=pdf>>, Feb. 1994, pp. 20.

(Continued)

*Primary Examiner* — Chae Ko
(74) *Attorney, Agent, or Firm* — Microsoft Corporation (57) ABSTRACT A duplicate-aware disk array (DADA) leaves duplicated content on the disk array largely unmodified, instead of removing duplicated content, and then uses these duplicates to improve system performance, reliability, and availability of the disk array. Several implementations disclosed herein are directed to the selection of one duplicate from among a plurality of duplicates to act as the proxy for the other duplicates found in the disk array. Certain implementations disclosed herein are directed to scrubbing latent sector errors (LSEs) on duplicate-aware disk arrays. Other implementations are directed to disk reconstruction/recovery on duplicate-aware disk arrays. Yet other implementations are directed to load balancing on duplicate-aware disk arrays.

19 Claims, 6 Drawing Sheets (56) References Cited

OTHER PUBLICATIONS

Arpaci-Dusseau, et al., "Fail-Stutter Fault Tolerance", Retrieved at<<http://citeseerx.ist.psu.edu/viewdoc/download?doi=10.1.1.25.2192&rep=rep1&type=pdf>>, 2001, pp. 6.

Bairavasundaram, et al., "An Analysis of Latent Sector Errors in Disk Drives", Retrieved at<<http://citeseerx.ist.psu.edu/viewdoc/download?doi=10.1.1.111.6822&rep=rep1&type=pdf>>, Jun. 12-16, 2007, pp. 289-300.

Bairavasundaram, et al., "An Analysis of Data Corruption in the Storage Stack", Retrieved at<<http://citeseerx.ist.psu.edu/viewdoc/download?doi=10.1.1.124.7245&rep=rep1&type=pdf>>, Nov. 2008, pp. 16.

Bhadkankar, et al., "BORG: Block-reORGanization for Self-optimizing Storage Systems", retrieved at <<http://www.usenix.org/events/fast09/tech/full_papers/bhadkamkar/bhadkamkar.pdf>>, pp. 183-196, 2007.

Blaum, et al., "EVENODD: An Optimal Scheme for Tolerating Double Disk Failures in RAID Architectures", Retrieved at<<http://ieeexplore.ieee.org/stamp/stamp.jsp?tp=&arnumber=288145>>, 1994, pp. 245-254.

Bolosky, et al., "Single Instance Storage in Windows 2000", Retrieved at<<http://www.usenix.org/events/usenix-win2000/full_papers/bolosky/bolosky.pdf>>, Aug. 2000, pp. 12.

Broder, Z. Andrei, "On the Resemblance and Containment of Documents", Retrieved at<<http://citeseerx.ist.psu.edu/viewdoc/download?doi=10.1.1.24.779&rep=rep1&type=pdf>>, 1997, pp. 9.

Broder, Z. Andrei, "Identifying and Filtering Near-Duplicate Documents", Retrieved at<<http://www.cs.princeton.edu/courses/archive/spr05/cos598E/bib/CPM%202000.pdf>>, 2000, pp. 10.

Brown, et al., "Towards Maintainability, Availability, and Growth Benchmarks: A Case Study of Software RAID Systems", Retrieved at<<http://www.usenix.org/events/usenix2000/general/full_papers/brown/brown.pdf>>, Proceedings of 200 USENIX annual Technical Conference, Jun. 18-23, 2000, pp. 15.

Alvarez, Carlos, "NetApp Deduplication for FAS and V-Series Deployment and Implementation Guide", Retrieved at<<http://www.bundlesparatubolsillo.es/download/tr-3505.pdf>>, Mar. 2009, pp. 40.

Corbett, et al., "Row-Diagonal Parity for Double Disk Failure Correction", Retrieved at<<http://citeseerx.ist.psu.edu/viewdoc/download?doi=10.1.1.116.6462&rep=rep1&type=pdf>>, Mar. 31-Apr. 2, 2004, pp. 15.

Debnath, et al., "ChunkStash: Speeding up Inline Storage Deduplication using Flash Memory", Retrieved at<< http://research.microsoft.com/pubs/132038/paper.pdf>>, Jun. 2010, pp. 16.

Denehy, et al., "Duplicate Management for Reference Data", Retrieved at<<http://domino.watson.ibm.com/library/cyberdig.nsf/papers/9ADD5F942230D74585256E3500578D88/$File/rj10305.pdf>>, Oct. 7, 2003, pp. 15.

Dholakia, Ajay, "A New Intra-Disk Redundancy Scheme for High-Reliability Raid Storage Systems in the Presence of Unrecoverable Errors", Retrieved at<<http://citeseerx.ist.psu.edu/viewdoc/download? doi=10.1.1.160.3658&rep=rep1&type=pdf>>, May 2008, pp. 42.

Dubnicki, et al., "HYDRAstor: A Scalable Secondary Storage", Retrieved at<<http://www.usenix.org/events/fast09/tech/full_papers/dubnicki/dubnicki_html/strzelczak_html.html>>, Dec. 21, 2010, pp. 19.

Efstathopoulos, et al., "Rethinking Deduplication Scalability", Retrieved at<<http://www.usenix.org/events/hotstorage10/tech/full_papers/Efstathopoulos.pdf>>, Jun. 2010, pp. 5.

"EMC Data Domain", Retrieved at<<http://www.datadomain.com/>>, Dec. 22, 2010, pp. 1.

Shu, Frank, "Notification of Deleted Data Proposal for ATA8-ACS2", Retrieved at<<http://t13.org/Documents/UploadedDocuments/docs2007/e07154r0-Notification_for_Deleted_Data_Proposal_for_ATA-ACS2.doc>>, Apr. 21, 2007, pp. 4.

Douglis, et al., "Application-Specific Delta-Encoding via Resemblance Detection", Retrieved at<<http://www.usenix.org/event/usenix03/tech/full_papers/douglis/douglis_html/>>, Dec. 21, 2010, pp. 23.

Holland, et al., "Parity Declustering for Continuous Operation in Redundant Disk Arrays", Retrieved at<<http://citeseerx.ist.psu.edu/viewdoc/download?doi=10.1.1.56.5032&rep=rep1&type=pdf>>,1992, pp. 13.

Holland, Mark, "On-Line Data Reconstruction in Redundant Disk Arrays", Retrieved at<<http://citeseerx.ist.psu.edu/viewdoc/download?doi=10.1.1.45.6472&rep=rep1&type=pdf>>, May 1994, pp. 254.

Huang, et al., "FS2: Dynamic Data Replication in Free Disk Space for Improving Disk Performance and Energy Consumption", Retrieved at <<http://citeseerx.ist.psu.edu/viewdoc/download?doi=10.1.1.125.4078&rep=rep1&type=pdf>>, Oct. 23-26, 2005.

Llaidis, et al., "Disk Scrubbing Versus Intra-Disk Redundancy for High-Reliability Raid Storage Systems", Retreived at<<http://citeseerx.ist.psu.edu/viewdoc/download?doi=10.1.1.159.9820&rep=rep1&type=pdf>>, Jun. 2-6, 2008, pp. 241-252.

Jain, et al., "TAPER: Tiered Approach for Eliminating Redundancy in Replica Synchronization", Retrieved at <<http:// www.usenix.org/events/fast05/tech/full_papers/jain/jain.pdf>>, FAST '05: 4th USENIX Conference on File and Storage Technologies, 2005, pp. 281-294.

Kari, H. Hannu, "Latent Sector Faults and Reliability of Disk Arrays", Retrieved at <<http://users.ics.tkk.fi/hhk/phd/phd_Hannu_H_Kari.pdf>>, 1997, pp. 194.

Koller, et al., "I/O Deduplication: Utilizing Content Similarity to Improve I/O Performance", Retrieved at<<http://users.cis.fiu.edu/~raju/WWW/publications/fast2010a/paper.pdf>>, Feb. 26, 2010, pp. 14.

Kulkarni, et al, "Redundancy Elimination within Large Collections of Files", Retrieved at<<http://citeseerx.ist.psu.edu/viewdoc/download?doi=10.1.1.85.7036&rep=rep1&type=pdf>>, Jun. 2004, pp. 14.

Russinavich, et al., "Microsoft Windows Internals (4th Edition)", retrieved at <<http://stud.usv.ro/~ctodosi/mwi.pdf>>, 2005, pp. 926.

Dewaikar, Mayur, "Symantec NetBackup Pure-Disk: Optimizing Backups with Deduplication for Remote Offices, Data Center and Virtual Machines", Retrieved at<<http://eval.symantec.com/mktginfo/enterprise/white_papers/b-symantec_netbackup_puredisk_WP.en-us.pdf>>, pp. 14.

Mi, et al., "Enhancing Data Availability in Disk Drives through Background Activities", Retrieved at <<http://ieeexplore.ieee.org/stamp/stamp.jsp?arnumber=04630120>>, International Conference on Dependable Systems & Networks, Jun. 24-27, 2008, pp. 10.

"Windows Logman", Retrieved at<<http://technet.microsoft.com/en-us/library/cc753820(WS.10).aspx>>, Sep. 28, 2007, pp. 2.

Moreton, et al., "Storage, Mutability and Naming in Pasta", Retrieved at<<http://citeseerx.ist.psu.edu/viewdoc/download-?doi=10.1.1.18.5976&rep=rep1&type=pdf>>, Apr. 2002, pp. 5.

Muntz, et al., "Performance Analysis of Disk Arrays under Failure", Retrieved at <<http://citeseerx.ist.psu.edu/viewdoc/download?doi=10.1.1.76.3089&rep=rep1&type=pdf>>, 1990, pp. 162-173.

Muthitacharoen, et al., "A Low-Bandwidth Network file System", Retrieved at<<http://citeseerx.ist.psu.edu/viewdoc/download-?doi=10.1.1.24.7456&rep=rep1&type=pdf>>, Dec. 2001, pp. 14.

Patterson, et al.,"Recovery Oriented Computing (ROC): Motivation, Definition, Techniques, and Case Studies" Retrieved at<<http://citeseerx.ist.psu.edu/viewdoc/download?doi=10.1.1.16.6351&rep=rep1&type=pdf>>, Mar. 15, 2002, pp. 16.

Patterson, et al."A Case for Redundant Arrays of Inexpensive Disks (RAID)", Retrieved at << http://www.cs.cmu.edu/~garth/RAIDpaper/Patterson88.pdf>>, 1998, pp. 109-116.

Pinheiro, et al.,"Failure Trends in a Large Disk Drive Population", Retrieved at <<http://static.googleusercontent.com/external_content/untrusted_dlcp/labs.google.com/en//papers/disk_failures.pdf>>, Appears in the Proceedings of the 5th USENIX Conference on File and Storage Technologies (FAST'07), Feb. 2007, pp. 13.

(56) References Cited

OTHER PUBLICATIONS

Policroniades, et al., "Alternatives for Detecting Redundancy in Storage Systems Data", Retrieved at<<http://www.usenix.org/event/usenix04/tech/general/full_papers/policroniades/policroniades_html/rabinPaper.html>>, Dec. 21, 2010, pp. 23.

Quinlan, et al., "Venti: A New Approach to Archival Storage", Retrieved at<<http://citeseerx.ist.psu.edu/viewdoc/download?doi=10.1.1.18.8085&rep=rep1&type=pdf>>, Jan. 28-30, 2002, pp. 14.

Rabin, Michael O., "Fingerprinting by Random Polynomials", Retrieved at<<http://www.xmailserver.org/rabin.pdf>, 1981, pp. 14.

Ruemmler, et al., "Disk Shuffling", Retrieved at<<http://www.hpl.hp.com/research/ssp/papers/HPL-91-156.pdf>>, Oct. 1991, pp. 23.

Reummler, et al., "An Introduction to Disk Drive Modeling", Retrieved at<<http://citeseer.xist.psu.edu/viewdoc/download;jsessionid=9F887BE0E700172661B5E48BFF929401?doi=10.1.1.117.39&rep=rep1&type=pdf>>, Mar. 1994, pp. 19.

Schindler, et al., "Atropos: A Disk Array Volume Manager for Orchestrated Use of Disks", Retrieved at<<http://citeseerx.ist.psu.edu/viewdoc/download?doi=10.1.1.102.2766&rep=rep1&type=pdf>>, Proceedings of the Third USENIX Conference on File and Storage Technologies, Mar. 31-Apr. 2, 2004, pp. 15.

Schroeder, et al., "Disk Failures in the Real World: What Does an MTTF of 1,000,000 Hours Mean to You?", Retrieved at<<http://www.cs.cmu.edu/~bianca/fast07.pdf>>, 5th USENIX conference on File and Storage Technologies, Feb. 14-16, 2007, pp. 16.

Schwarz, et al., "Disk Scrubbing in Large Archival Storage Systems", Retrieved at<<http://ieeexplore.ieee.org/stamp/stamp.jsp?tp=&arnumber=1348296>>, 2004, pp. 10.

Tolia, et al., "Opportunistic Use of Content Addressable Storage for Distributed File Systems", Retrieved at<<http://www.cs.ucl.ac.uk/staff/b.karp/casper-usenix2003.pdf>>, 2003, pp. 14.

Tridgell, Andrew, "Efficient Algorithms for Sorting and Synchronization", Retrieved at<<http://citeseerx.ist.psu.edu/viewdoc/download?doi=10.1.1.25.2666&rep=rep1&type=pdf>>, Apr. 2000, pp. 115.

Tweedle, EXT3, Journaling File System http://olstrans.sourceforge.net/release/OLS2000-ext3/OLS2000-ext3.html, Jul. 2000.

Ungureanu, et al., "HydraFS: A High-Throughput File System for the HYDRAstor Content-Addressable Storage System", Retrieved at <<http://www.usenix.org/events/fast10/tech/full_papers/ungureanu.pdf, Feb. 2010, pp. 14.

Wang, et al., "On the Impact of Disk Scrubbing on Energy Savings", Retrieved at<<http://people.cs.vt.edu/~butta/docs/hotpower08-scrub.pdf>>, Dec. 2008, pp. 5.

Wilkes, "The HP AutoRAID Hierarchical Storage System", Retreived at<<http://citeseerx.ist.psu.edu/viewdoc/download-?doi=10.1.1.158.1739&rep=rep1&type=pdf>>, 1996, pp. 29.

Yu, et al., "Trading Capacity for Performance in a Disk Array", Retrieved at<<http://citeseerx.ist.psu.edu/viewdoc/download?doi=10.1.1.75.1367&rep=rep1&type=pdf>>, 2000, pp. 16.

Zhu, et al., "Avoiding the Disk Bottleneck in the Data Domain Deduplication File System", Retrieved at<<http://www.modcomp.com/pdf/Whitepapers/Storage/Data%20Domain/Data%20Domain%20-%20Avoiding%20the20Disk%20Bottleneck.pdf>>, 2008, pp. 14.

Cox et al., "Pastiche: Making Backup Cheap and Easy," Retrieved at <<http://citeseerx.ist.psu.edu/viewdoc/download? doi=10.1.1.101.3227&rep=rep1&type=pdf, Dec. 9-11, 2002, 15 pages.

Hsu, Windsor, W. et al., "The Automatic Improvement of Locality in Storage Systems," Retrieved at <<http://www.eecs/berkeley.edu/Pubs/TechRpts/2003/CSD-03-1264.pdf, Jun. 2-6, 2008, 44 pages.

Oprea, Alina, et al., "A Clean-Slate Look at Disk Scrubbing," Retrieved at <<http://www.rsa.com/rsalabs/staff/bios/aoprea/publications /scrubbing.pdf, Mar. 15, 2002, 14 pages.

\* cited by examiner

DUPLICATE-AWARE DISK ARRAYS

BACKGROUND

It is common to have duplicate data content stored in a storage system. Consequently, minimizing duplicate content on disk storage systems—at both the file and block levels—has received a lot of attention from both academia and industry. Much of this research effort has been directed to deduplication storage systems or "single-instance stores" which, as the names imply, store only one copy of each unique data instance. Since deduplication is inherently difficult, much of this past work has been focused on improving the efficiency, scalability, and speed of in-line deduplication.

Deduplication storage systems are particularly useful for archival and backup purposes where there may be a large number of duplicates and where storage capacity is the major cost consideration making maximizing data storage a primary objective. On such systems, deduplication can provide excellent reductions in storage capacity, bandwidth, and power.

However, in primary storage systems—such as file servers and web servers that store user content, as well as personal and portable computer systems—reducing duplication is less beneficial since such systems may have only a relatively moderate degree of duplication and the dynamic and unpredictable workload characteristics of such systems inherently make deduplication all the more difficult to implement and achieve. Moreover, other metrics—such as performance and reliability—are more important in primary storage systems than capacity, and thus maximizing capacity is not a primary objective of such systems. Also, as the cost of storage continues to decline, the value of removing duplicates to save storage space continues to decline for both primary storage systems as well as archival and backup storage systems, further eroding the cost savings from deduplication.

SUMMARY

Duplicate-aware disk arrays (DADAs) leave duplicated content on the disk arrays largely unmodified, instead of removing duplicated content, and then use these duplicates to improve system performance, reliability, and availability of the disk arrays.

Several implementations are directed to the selection of one duplicate from among a plurality of duplicates to act as the proxy for the other duplicates found in the disk array. Certain implementations are directed to methods for scrubbing latent sector errors (LSEs) on duplicate-aware disk arrays. Other implementations are directed to disk reconstruction/recovery on duplicate-aware disk arrays. Yet other implementations are directed to load balancing on duplicate-aware disk arrays.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Physical disks (such as those comprising disk arrays) are an inherently unreliable component of computer systems. To address this shortcoming, "mirroring" is the replication of logical disk volumes onto separate physical hard disks in real-time to ensure continuous availability. The basic idea is to automatically maintain multiple copies of data so that in the event of a disk hardware failure the system can continue to process and/or quickly recover data. Although some forms of mirroring can be accomplished in software or by the operating system, typically mirroring is provided by the disk array hardware where a mirrored volume is a complete logical representation on two physical disks constituting separate but identical volume copies of each other.

Mirroring may be done locally where it is specifically to cater for disk unreliability, or it may be done remotely where it forms part of a more sophisticated disaster recovery scheme, or it may be done both locally and remotely, especially for high availability systems. Normally, data is mirrored onto physically identical drives, although the process can be applied to non-identical drives, logical drives, and the like where, for example, the underlying physical format is hidden from the mirroring process.

Figure 1:
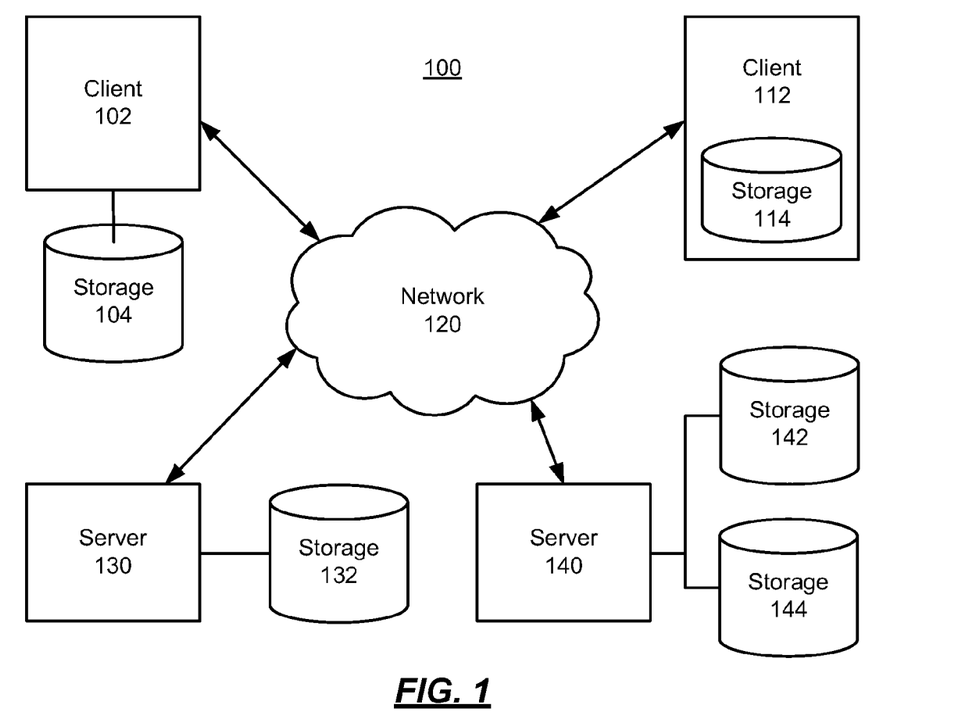
FIG. 1 is an illustration of a search engine in an exemplary network environment in which the numerous implementations disclosed herein may be utilized.

FIG. 1 is an illustration of an exemplary networked computer environment 100 in which the numerous implementations disclosed herein may be utilized. The network environment 100 may include one or more clients 102 and 112 configured to communicate with each other or with one or more servers 130 and 140 through a network 120. A client, such as client 102, may comprise an external or removable storage device 104, or a client, such as client 112, may comprise an internal or non-removable storage device 114. A server, such as server 130, may also comprise a storage device 132 or, such as server 140, a collection of storage devices 142 and 144. The network 120 may be a variety of network types including the public switched telephone network (PSTN), a cellular telephone network, and a packet switched network (e.g., the Internet).

While the clients 102 and 112 and the servers 130 and 140 are illustrated as being connected by the network 120, in some implementations it is contemplated that the clients 102 and 112 and the servers 130 and 140 may be directly connected to each other or even executed by the same computing system. Similarly, while the storage devices 104, 114, 132, 142, and 144 are shown as connected to one of a client or a server, in some implementations it is contemplated that the storage devices 104, 114, 132, 142, and 144 may be connected to each other or to more than one client and/or server, and that such connections may be made over the network 120 as well as directly.

Figure 6:
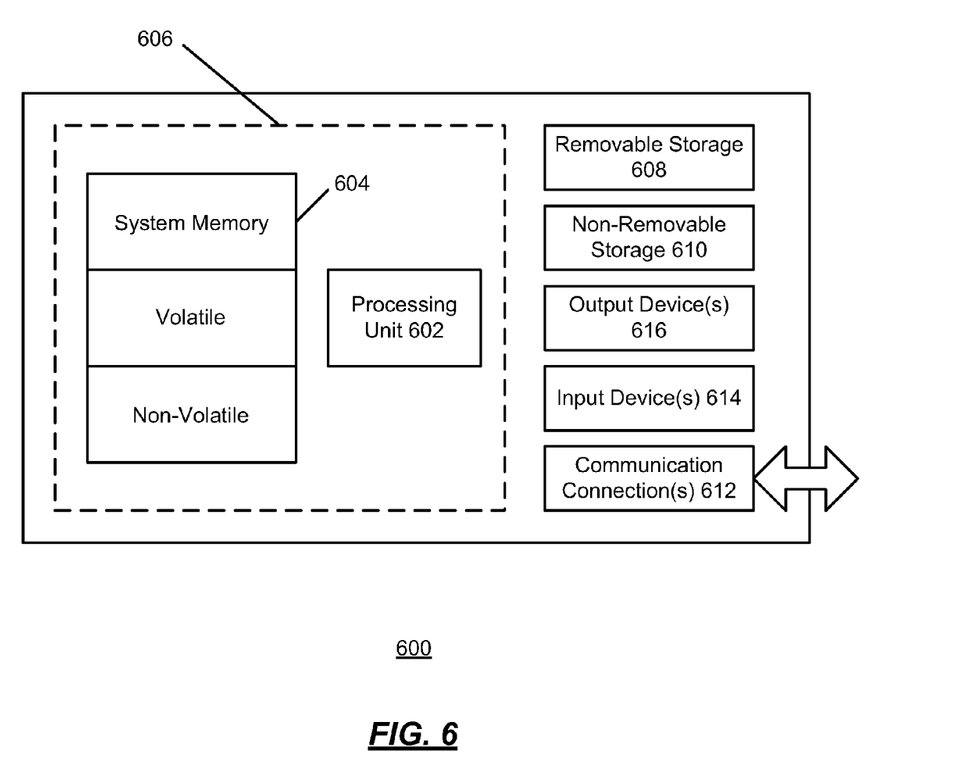
FIG. 6 shows an exemplary computing environment.

In some implementations, the clients 102 and 112 may include a desktop personal computer, workstation, laptop, PDA, cell phone, smart phone, or any WAP-enabled device or any other computing device capable of interfacing directly or indirectly with the network 120 such as a computing device 600 illustrated in FIG. 6. The clients 102 and 112 may run an HTTP client, e.g., a browsing program, such as MICROSOFT INTERNET EXPLORER or other browser, or a WAP-enabled browser in the case of a cell phone, PDA or other wireless device, or the like, allowing a user of the clients 102 and 112 to access information available to it at the servers 130 and 140 or to provide information to the servers 130 and 140. Other applications may also be used by the clients 102 and 112 to access or provide information to the servers 130 and 140, for example. In some implementations, the servers 130 and 140 may be implemented using one or more general purpose computing systems such as the computing device 600 illustrated in FIG. 6.

Figure 2A:
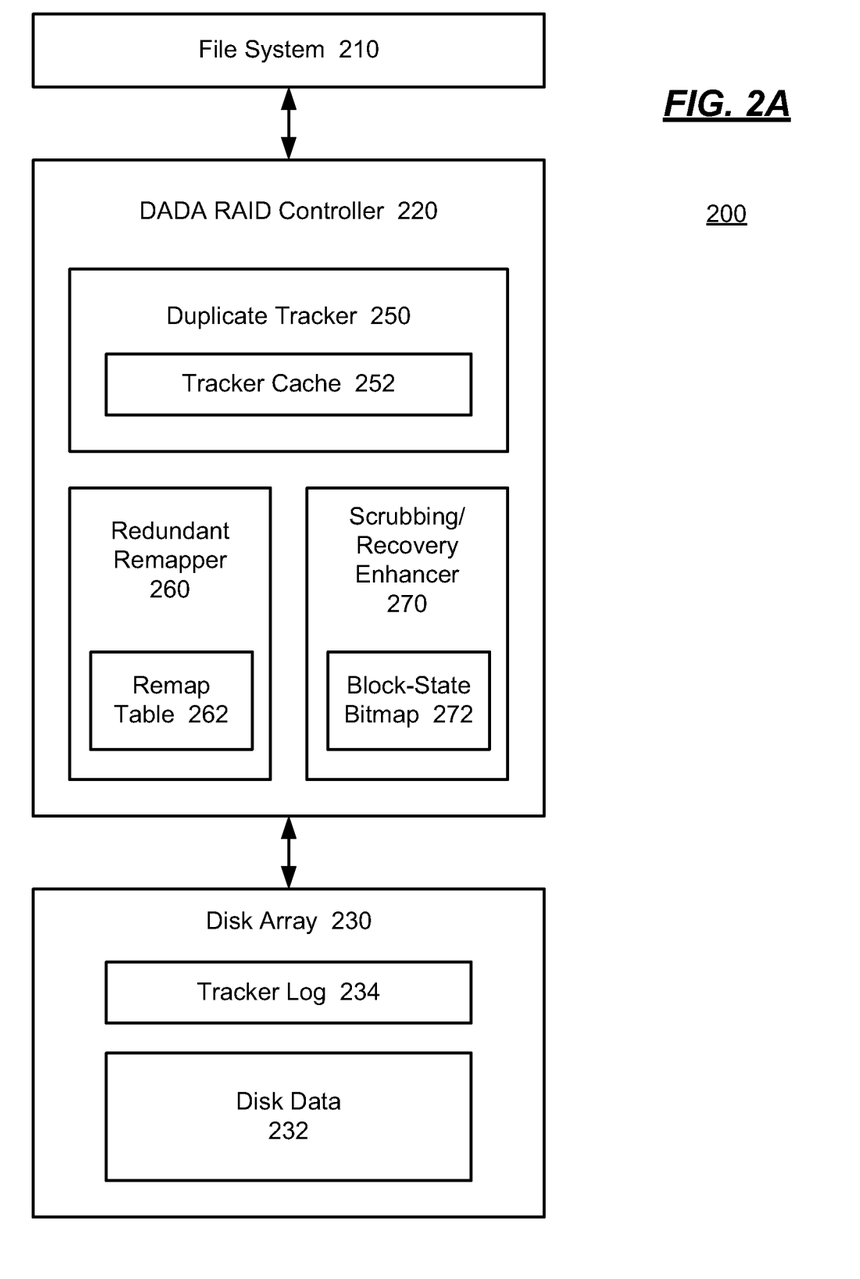
FIG. 2A is a architectural block diagram representative of several implementations of a duplicate-aware disk array disclosed herein.
Figure 2B:
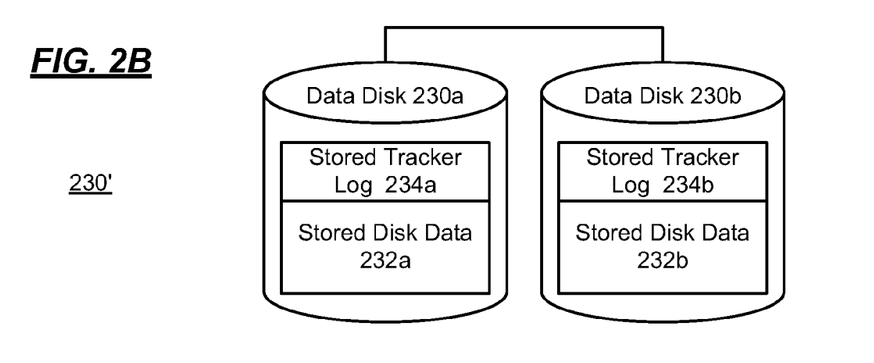
FIG. 2B is a block diagram representative of a RAID-1 disk array utilized in certain of the duplicate-aware disk array implementations herein disclosed.

FIG. 2A is an architectural block diagram representative of several implementations of a duplicate-aware disk array, and FIG. 2B is a block diagram representative of a RAID-1 disk array utilized in certain of the duplicate-aware disk array implementations. As shown in FIGS. 2A and 2B, a basic implementation of a DADA system 200 comprises a DADA RAID controller 220 at the disk array controller level below the file system 210 level and above the disk array 230 level. The DADA RAID controller 220 intercepts input/output (I/O) requests from the file system 210 and processes these requests to issue appropriate commands to the disk array 230. The DADA RAID controller 220 comprises a duplicate tracker 250, a redundant remapper 260, and a scrubbing/recovery enhancer 270. The duplicate tracker 250 comprises a tracker cache 252. The redundant remapper 260 comprises a remap table 262, and the scrubbing/recovery enhancer 270 comprises a block-state bitmap 272. The disk array 230 logically comprises disk data 232 and a tracker log 234. The disk array 230 may physically comprise mirrored disks (such as a RAID-1 disk array), in which case the disk array hardware 230' may physically comprise a first data disk 230a and a second data disk 230b each comprising stored disk data 232a and 232b and a stored tracker log 234a and 234b, respectively, wherein the physical disks 230a and 230b are maintained as logical mirrors (and, in some implementations, physical copies) of each other (without regard for defects and other nonlogical differences).

In order to track the disk array's disk data 232 and identify duplicate blocks therein, various implementations of the duplicate tracker 250 compute a "fingerprint" for each data block written to the disk array 230 when the DADA RAID controller 220 receives each such block from the file system 210 during a "write" operation. This fingerprint may be, for example, a 64-bit Rabin fingerprint corresponding to and uniquely identifying contents of a 4 KB block of data, although any of several other techniques for uniquely identifying block contents are also anticipated for alternative embodiments. Regardless, several implementations utilize a 4 KB block size corresponding to a 4 KB sector size typical for a data disk such as data disks 230a and 230b. Other implementations may use different block and sector sizes, although many of these will use a block size equivalent to the sector size.

When calculated, the duplicate tracker 250 stores the fingerprint, along with that block's associated logical block number (corresponding to the location where the block is stored as stored disk data 232a and 232b on the disk array hardware 230'), as a block-to-fingerprint entry (in a block-based index for some implementations) in the tracker cache 252. Also calculated and stored in the tracker cache 252 is a corresponding fingerprint-to-block entry as part of a reverse-lookup index. The tracker cache 252 contents are also maintained on the disk array as the tracker log 234 such that the tracker cache 252 contents are periodically appended to the disk array 230 and the tracker log 234 updated with the latest block-to-fingerprint and fingerprint-to-block information. Alternatively, the duplicate tracker 250 might only comprise the block-to-fingerprint entries and the fingerprint-to-block entries might only be maintained in the tracker log 234, in which case the fingerprint-to-block entries might only be periodically processed when the fingerprint log is processed to update its information. It should be noted that, as will be understood and appreciated by those of skill in the relevant art, this logical block number, existing at the DADA RAID controller 220 level, may or may not equate (but nonetheless correspond) to a logical block number at the file system 210 level, and in fact for most file system implementations common today it will not.

For certain implementations, DADA may be implemented before any other data is written to the disk array 230, and thus the initial fingerprint information for each block is generated real-time during write operations to the disk array 230. For other implementations where DADA might be initialized on a disk array 230 that already contains disk data (e.g., disk data 232), initial fingerprint information for each block comprising this on-disk data may be derived by reading each stored block on the disk array and calculating the initial fingerprints for each such preexisting data block, and then thereafter computing new fingerprints real-time during write operations to the disk array.

In order to maintain the consistency between the tracker cache 252 and the tracker log 234, for certain implementations the tracker cache 252 may be non-volatile, e.g., comprising 1 MB of NVRAM (NVRAM not being uncommon in high-end disk arrays). Moreover, since the tracker log 234 is maintained as a RAID-1 on-disk structure, it is provided with the same level of mirrored redundancy (tracker logs 234a and 234b) as the disk data 232 (stored disked data 232a and 232b) that is replicated on the RAID-1 disk array hardware 230', that is, on both data disks 230a and 230b.

Based on the fingerprint information, each data block can be classified as a "singlet" when it has no duplicates and as a "multiplet" when it has at least one duplicate. The classification of each block can be determined based on the information collected by the duplicate tracker 250 and stored in the tracker cache 252 and the tracker log 234. In some implementations, for example, the fingerprint-to-block index can be sorted by fingerprints to sequentially group together all of the blocks having the same signature and together comprising a "multiplet set." Each multiplet set can be internally sorted by the logical block number to identify both the sequential order of the blocks, as well as adjacent blocks, comprising the stored disk data 232a and 232b in the disk array hardware 230'. This information, in turn, is used to achieve the scrubbing and recovery optimizations, alluded to earlier herein, by allowing redundant blocks to be efficiently "skipped" during certain operations, or for a duplicate block to be selectively utilized in place of another when needed in other operations. In general, this is achieved by selecting one block from among the blocks comprising each multiplet set as the "proxy" block for each such set whereby the proxy is thereafter utilized in normal operations (similar to a singlet) instead of the non-proxy blocks or "redundants" of each multiplet that are mostly skipped or ignored thereafter.

In certain implementations, for example, this duplication information can be used to improve the efficiency of disk scrubbing for latent sector errors (LSEs). LSEs are sectors on a physical disk (such as data disks 230a and 230b) that become inaccessible and the data stored at that sector is effectively lost—and thus LSEs are a concern in providing data reliability. LSEs are relatively common and are often due to physical imperfections arising in the physical disk media. Moreover, as might be expected, the number of LSEs on a physical disk generally may increase as the capacity of disks increase such that the proportion of LSEs to disk capacity remains relatively unchanged. In mirrored disk configurations such as RAID-1, the presence of the mirrored disks provides an opportunity for data to be recovered from one disk when the other disk is found to have a LSE—in which case, the data is copied from the corresponding good sector on the one disk to another location on both disks (to preserve redundancy) and both the bad sector on the other disk as well as the good sector on the one disk are no longer used (since mirroring can no longer be achieved).

To detect LSEs, typical disk array implementations may regularly "scrub" the physical disks 232a and 232b, that is, check the physical disks for latent system errors (generally using checksums). An approach to scrubbing in several implementations (particularly those using a block size equivalent to the sector size, e.g., 4 KB) is to read the same sector on each disk 232a and 232b and, if the data (i.e., the bits) comprising each block as stored at that sector on each disk 232a and 232b are logically identical (e.g., return the same checksum), then the blocks on each disk 232a and 232b may be presumed to be free of LSEs (since they return the expected data in a read operation). If the data comprising the blocks at that sector are different on each disk 232a and 232b, however, then an LSE has been detected.

To recover from this LSE, the contents of the block on each disk are read and temporarily stored, and then the questionable sector on each disk 232a or 232b is tested using a successive series of writes and reads (and perhaps alternating writes of all 0s followed by all 1s in some implementations) to determine on which disk 232a or 232b the error exists. Once this is determined, the data from the undamaged sector (that is, from the sector on disk 232a or 232b without the LSE at that sector) is known to be the good data and is subsequently stored elsewhere on the disks 232a and 232b (presumably in two unused sectors without any LSEs) and, typically, the bad sector on both disks 232a and 232b is no longer utilized. Several other approaches also exist for scrubbing physical disk sectors to find LSEs, but in general most implementations use approaches that sequentially check at least every "used" sector on the physical disks (that is, sectors having stored data), if not every single sector (used or unused) on the disk to identify and locate LSEs during routine scrubbing.

Although scrubbing is mostly scheduled as a background activity, it can still negatively impact overall system performance for several reasons. First, for disk arrays that are continuously used, there may be little idle time for scrubbing and thus can impact foreground processes. Second, the time taken to scrub an entire disk increases as the capacity of the disk increases; therefore, even if there is some idle time, given the large capacity disks of today it may not be enough time for a scrub process to complete before impacting foreground applications. Third, if a significant number of corruptions are detected during, for example, a RAID reconstruction, more aggressive scrubbing might be required than normal which, in turn, can impact foreground performance.

However, using several of the DADA implementations disclosed herein, the scrubbing/recovery enhancer 270 may use the duplicate information during the scrubbing process to generally skip (not scrub) the redundants—that is, the non-proxy blocks of a multiplet. In addition, if an LSE is detected on a sector for a proxy block, one of that proxy's redundants (i.e., a non-proxy duplicate block in the multiplet), upon being verified as not having an LSE itself, can become the new proxy for the multiplet, and the old proxy block can be discarded, thereby requiring no additional copying of the old proxy block to memory or other testing to determine on which disk 232a or 232b the LSE has occurred (and bad data) and which has good data. In certain implementations that employ this kind of selective scrubbing, only the proxy block is accessed whenever a read operation is made to any of the redundants in the same multiplet, thereby better ensuring a valid (scrubbed) version of the data block is returned from the read operation.

With regard to recovery from LSEs, it should be noted that redundants can also be used in those instances where an LSE occurs on both disks 232a and 232b—a situation where data typically cannot be recovered by a non-DADA RAID-1 disk array—in that DADA may utilize its knowledge of duplicates in similar fashion to recover that sector if the block at that sector is a multiplet (and thus has a redundant or proxy copy located somewhere else in the disk array).

Figure 3A:
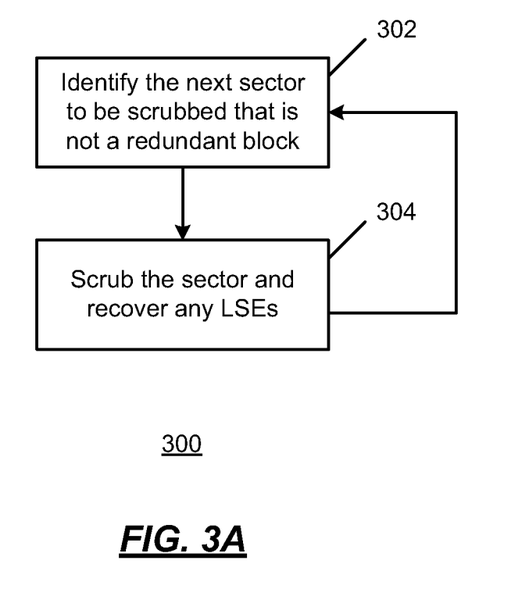
FIG. 3A is an operational flow diagram of an exemplary process for scrubbing several implementations of a DADA system for latent sector errors (LSEs)
Figure 3B:
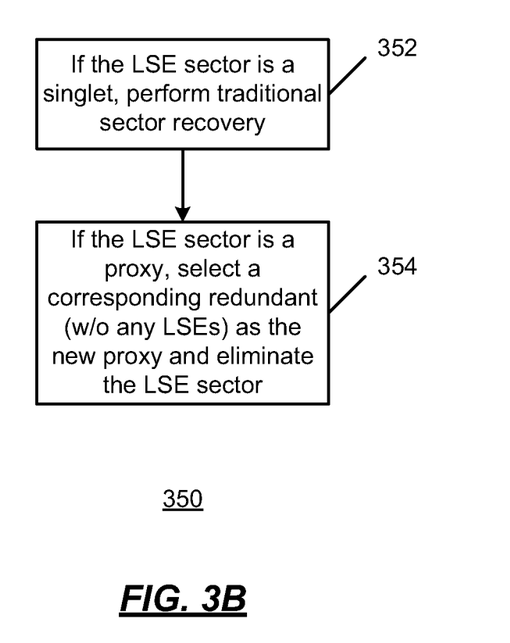
FIG. 3B is an operational flow diagram of an exemplary process for recovering a data block from an LSE utilized by various implementations of a DADA system.

FIG. 3A is an operational flow diagram of an exemplary process 300 for scrubbing several implementations of a DADA system for LSEs, and FIG. 3B is an operational flow diagram of an exemplary process 350 for recovering a data block from an LSE utilized by various implementations of a DADA system. Referring to FIGS. 3A and 3B, at 302 the system identifies the next sector to be scrubbed that does not contain a redundant block and, at 304, the system scrubs the sector and, if any LSEs are found, recovers the sector before returning to 302. To recover a sector, at 352 the system determines if the LSE sector is a singlet and, if so, recovers the LSE sector using a traditional means such as the one described earlier herein. Then, at 354, if the LSE sector is a proxy, the system recovers the LSE by selecting one of the proxy's corresponding redundants (one without any LSEs of its own) as the new proxy for the multiplet and then eliminates the LSE sector (and, as necessary, redirects all block-level references to the original proxy block/sector to the new proxy block/sector).

Duplication information can also be used in several implementations to assist with recovery, or "rebuilding," when an entire disk fails in disk arrays with more than two physical disks. For example, consider a disk array that has five disks comprising two sets of mirrored disks and an unused extra disk. In this kind of disk array configuration, when one physical disk (i.e., one of a pair of mirrored disks) fails, it can be rebuilt on the unused extra disk using the still-functioning mirror disk by copying the surviving disk in the mirrored pair with the failed disk. However, during this rebuilding process, system performance is usually degraded as the disk system is fully occupied in copying data from the surviving disk to the extra disk to recreate a mirrored pair. Moreover, due to increasing disk capacity coupled with largely unchanged (and thus limited) disk communication bandwidth, reconstructing a full disk can be very time consuming. Although disk reconstruction can be scheduled along with foreground activities, the limited bandwidth may lead to a delay in full reconstruction of that mirrored pair which, in turn, puts the disk array reliability at greater risk the longer it remains uncompleted.

Using duplicates, however, various implementations of the DADA system 200 may use the scrubbing/recovery enhancer 270 to reduce the time used for recovering a physical disk by copying only singlets and proxies to the new disk, and skipping the copying of the redundants until a later time. Since the singlets and proxies together constitute a complete representation of the data stored on a disk, the new disk can be brought online more quickly due to the time saved by not copying the redundants. Then, once the new disk is up and running with the singlets and proxies, the redundants can be copied as a background process without impacting foreground applications. During this second process, and for simplicity and data integrity, reads from redundants (non-proxy blocks which may not yet be copied) may be served from only the surviving disk, whereas writes to redundants may be made immediately to both disks comprising the new mirrored pair.

As disclosed earlier herein, singlets are blocks with unique contents and multiplets are sets of blocks with same contents. For each multiplet set, DADA selects a representative block, called a proxy, and the rest of the blocks in the multiplet are redundants. During scrubbing or recovery, only the singlets and proxies might be processed, whereas the redundants may be skipped. Some implementations of this process may use a block-state bitmap 272 which contains one bit for each block in the storage. In the block-state bitmap 272, all the bits corresponding to singlets and proxies are set (e.g., "1"), whereas the bits belonging to redundants are cleared (e.g., "0"). The scrubbing/recovery enhancer 270 can then use the bitmap to decide which blocks to scrub or recover and which ones to skip.

Since scrubbing may occur concurrently with foreground workloads in certain implementations, it is useful to keep track of how foreground writes modify block contents since a write to a redundant can change its status to a singlet which then is scrubbed. To capture these changes, some of these implementations may mark a redundant as a singlet in the block-state bitmap whenever it is written to. Since the block is marked as a singlet, it will be scrubbed and otherwise treated as a singlet even if the write did not change a redundant into a singlet. Similarly, writes can also alter the contents of a proxy which, if altered, may no longer be representative of the other blocks of its multiplet set. To capture these changes, some implementations may mark the proxy as a singlet whenever it is written to, and then choose another block from the multiplet set as the new proxy for scrubbing and use. These implementations may then later, during some kind of periodic review, reprocess the fingerprint-to-block information and generate a more accurate block-state bitmap by grouping these singlets back with their corresponding multiplets if their content was in fact unchanged. During this process, in some implementations, a former proxy may also be restored to proxy status for its multiplet as well if its content was not changed by the write operation that resulted in its change in status.

To further enhance the efficiency gains from the use of duplicates in a DADA system as discussed herein, additional performance enhancements can be achieved through proxy selection and remapping redundants.

Since duplicates may be scattered over the entire address space, selecting the right block from a set of multiplets as the proxy can increase efficiency gains. Just as picking a random block as the proxy might fragment the redundants that use a greater number of disk seeks (each seek being relatively time consuming and a drain on overall system efficiency), selecting the right proxy can minimize the number of disk seeks and improve performance.

Figure 4A:
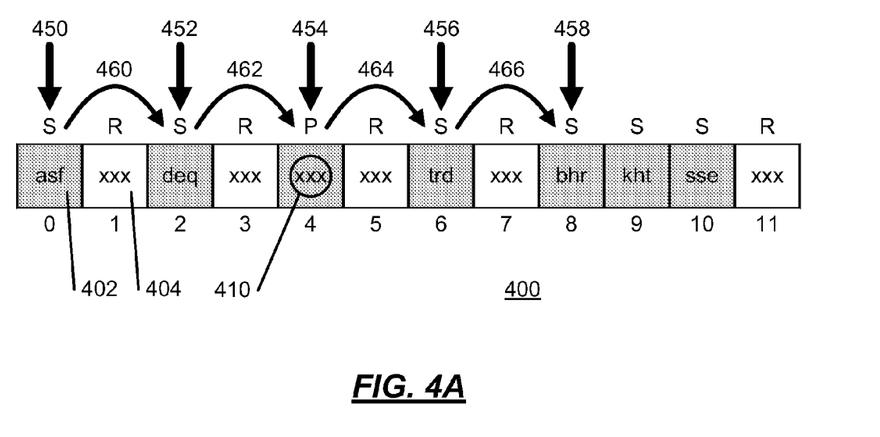
FIG. 4A is block diagram illustrating consecutive blocks (or sectors) stored in an address space of a disk array representative of several implementations of a DADA system.

FIG. 4A is block diagram 400 illustrating consecutive blocks (or sectors)—e.g. 402, 404, etc.—stored in an address space of a disk array representative of several implementations of a DADA system. In FIG. 4A, and for illustrative purposes only, the address space shown consists of twelve blocks numbered 0-11 (immediately below each block) for convenience. (Of course, in a real disk array, the number of blocks corresponding to an address space would be much larger, but the same principles would apply.) As shown, the six blocks 0, 2, 6, 8, 9, and 10 are singlets (S) having unique content (represented by the three-letter combinations in each block) and blocks 1, 3, 4, 5, 7, and 11 are multiplets with the same content (represented by the same three-letter combination of "xxx" in each such block) where one (specifically, block 4) is selected at random as the proxy (P) 410 and the others are marked as redundants (R) (the markings S, P, and R shown immediately above each block). As such, the shaded (e.g., 402) blocks 0, 2, 4, 6, 8, 9, and 10 will be read while the five un-shaded (e.g., 404) blocks 1, 3, 5, 7, 11 will be skipped in a scrub or recover operation. However, the block selected as the proxy 410 is significant because the scrubber (or recovery module) will incur a different number of seeks depending on the location of the proxy. As shown in the figure, a total of five seeks (an initial seek 450 at the beginning of the address space, and four more seeks 452, 454, 456, and 458 for each jump or "skip" 460, 462, 464, and 466 over one or more redundants) is needed to scrub every required block (including the proxy 410 on behalf of itself and its redundants). However, as the number of seeks increases, the benefits from skipping are diminished and may be outweighed altogether by the cost of the extra seeks.

Figure 4B:
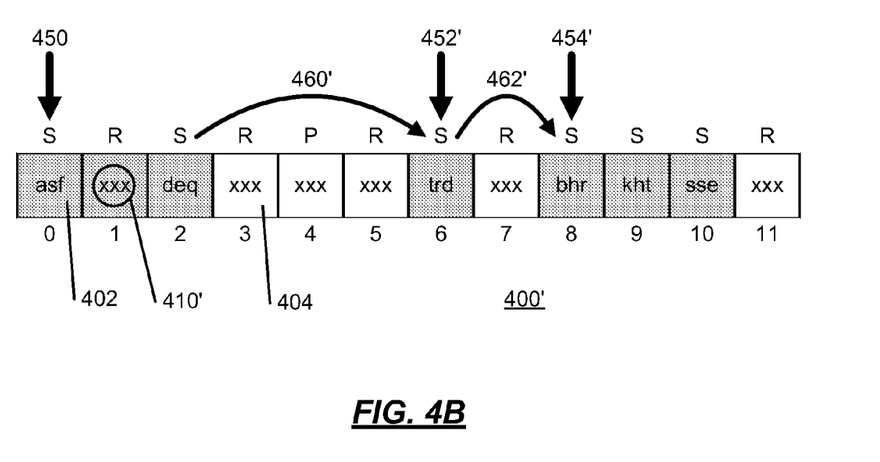
FIG. 4B is block diagram illustrating consecutive blocks (or sectors) stored in an address space of a disk array representative of several implementations of a DADA system wherein the proxy is selected to minimize the number of seeks.

FIG. 4B is block diagram 400' illustrating consecutive blocks (or sectors)—e.g. 402, 404, etc.—stored in an address space of a disk array representative of several implementations of a DADA system wherein the proxy is selected to minimize the number of seeks. In FIG. 4B, and again for illustrative purposes only, the address space shown once again consists of twelve blocks numbered 0-11 (immediately below each block) for convenience. However, in order to minimize the number of seeks, certain implementations select the multiplet block with the lowest offset as the proxy 410', and thus block 1 is selected as the proxy for the multiplets comprising blocks 1, 3, 4, 5, 7, and 11 in the figure as shown, thereby requiring only three seeks (an initial seek 450 at the beginning of the address space, and two more seeks 452' and 454' for each jump or "skip" 460' and 462' over one or more redundants). By selecting the multiplet block with the lowest offset, the proxy will never fragment a string of redundants into two smaller strings—which would also be true, of course, if the multiplet block with the highest offset was selected. However, using the block with the lowest offset as the proxy 410' rather than highest offset also provides an additional advantage stemming from the fact, widely known and readily appreciated by those of skill in the art, that lower offsets are typically located towards the outermost tracks of the physical data disk and, therefore, get higher bandwidth due to prevalent disk zoning practices.

Alternative implementations may implement different proxy-selection approaches. Some implementation may use segment-based proxy selection that divides the disk space into equal-sized regions and counts the number of singlets present in those regions; then, for a given multiplet set, it picks the block whose region contains the most singlets as the proxy. Other implementations may use an N-neighbor proxy-selection approach where, for each block B in a multiplet set, the N neighboring blocks (at most, N/2 blocks on either side of B) are examined to determine the number of singlets present in them, and the block with the highest number of singlet neighbors is selected as the proxy of its multiplet set.

Even though such proxy-selection attempt to select proxies without fragmenting redundants, there may still be sequences of redundant blocks that are naturally fragmented on the physical data disk. Therefore, as a further enhancement to reduce the number of seeks, various implementations of a DADA system may remap redundants to reduce fragmentation and the corresponding number of seeks necessary in scrubbing or recovery operations. In certain implementations, the redundant remapper 260, comprising a remap table 262 in some such implementations, may be used to search for fragmented redundants and remap the redundants in order to group them together (so that they can be skipped with just one seek). In some implementations, the redundant remapper 260 may divide the address space into block chunks (of 4096 consecutive blocks in one implementation) and then remap blocks within that chunk to keep the remapping relatively local to the non-redundant data in the block.

Figure 5:
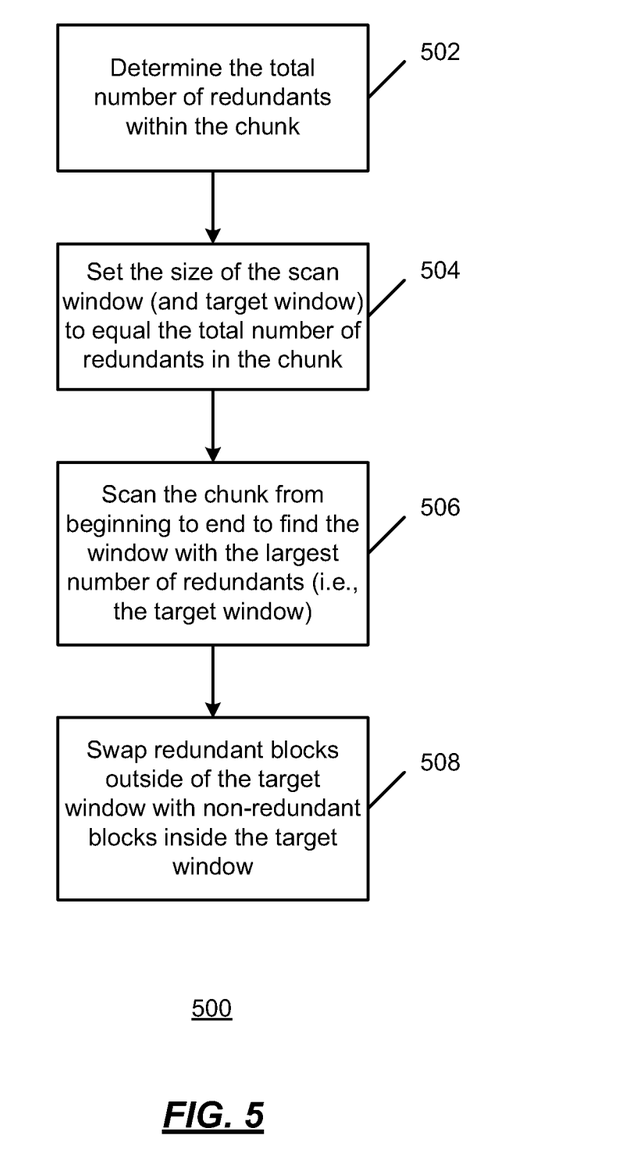
FIG. 5 is an operational flow diagram of the process for picking candidate redundant blocks for remapping for various implementations disclosed herein.

FIG. 5 is an operational flow diagram 500 of the process for picking candidate redundant blocks for remapping for various implementations disclosed herein. At 502, the total number of redundants within a chunk is determined. At 504, the size of the scan window (and the target window) is set to be equal to total number of redundants in that chunk. At 506, the chunk is scanned from beginning to end to find the string of blocks equal in size to the maximum number of blocks having the greatest number of redundants, that is, the most ideal target window (since it will use the fewest swaps). Once the target window is identified, at 508, redundant blocks outside of the window are iteratively swapped with non-redundant blocks currently within the window until the target window is entirely comprised of redundant blocks.

As an enhancement, certain implementations of a DADA system may use duplicates for balancing the load across physical disks in a RAID array. As is known, RAID arrays can develop performance "hot spots" for a variety of different reasons—for example, some disks give different performances than others, and some disks may suffer dynamic performance variations due to, for example, bad-block remapping. Consequently, workloads may exhibit regions of high and low activity, and these DADA implementations can observe the load on each of its disks and, when possible, make use of duplicates to redirect requests to a different drive or to a different location on the same drive for load balancing or other performance enhancements.

FIG. 6 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A duplicate-aware disk array comprising:
    a system for identifying at least a first set of multiplets in the duplicate-aware disk array, the first set of multiplets comprising at least two data blocks with the same data content;
    a system for selecting one multiplet from the first set of multiplets to serve as a proxy for the first set of multiplets, and designating the remaining multiplets in the first set of multiplets that are not selected as the proxy as redundants; and
    a system for using duplication information derived from selecting the proxy and designating the redundants, to execute an enhanced scrubbing operation on the duplicate-aware disk array, the enhanced scrubbing operation comprising skipping over one or more redundants.

2. The duplicate-aware disk array of claim 1, wherein the duplicate-aware disk array comprises at least two disks in a mirrored disk configuration, and further wherein the proxy is the one multiplet having the lowest offset in the first set of multiplets.

3. The duplicate-aware disk array of claim 1, wherein a data block is identified as a multiplet by calculating a first fingerprint for the data block and then comparing the first fingerprint to a second fingerprint for another data block to assess similarity.

4. The duplicate-aware disk array of claim 1, wherein the enhanced scrubbing operation is directed to detect latent sector errors (LSEs) and includes scrubbing at least one singlet and at least one proxy while skipping at least one redundant contained in the duplicate-aware disk array.

5. The duplicate-aware disk array of claim 1, wherein the system for using duplication information is further configured to execute a recovery operation to address a latent sector error (LSE).

6. The duplicate-aware disk array of claim 5, wherein addressing the latent sector error (LSE) for a sector containing a first proxy comprises selecting another multiplet from among the first set of multiplets as a new proxy for the first set of multiplets.

7. The duplicate-aware disk array of claim 2, wherein the system for using duplication information is further configured to execute a rebuild operation to restore a first disk in the at least two disks, comprises rebuilding singlets and proxies before rebuilding redundants.

8. The duplicate-aware disk array of claim 1, wherein redundants are grouped together to reduce disk seeks during at least one of a recovery operation, a rebuild operation, or the enhanced scrubbing operation.

9. The duplicate-aware disk array of claim 1, wherein a fingerprint for each block of data written to the duplicate-aware disk array is calculated and stored with a logical block number corresponding to each block.

10. The duplicate-aware disk array of claim 1, wherein a duplicate block is accessed in lieu of a target block to balance the load across at least two disks of the duplicate-aware disk array.

11. A method of improving performance in a disk array by tracking redundant blocks, the method comprising:
    identifying at least a first set of multiplets in the disk array, the first set of multiplets comprising at least two data blocks with the same data content;
    selecting one multiplet from the first set of multiplets to serve as a proxy for the first set of multiplets and designating the remaining multiplets in the first set of multiplets as redundants; and
    using duplication information derived from selecting the proxy and designating the redundants to group duplicates together on a disk for reducing the number of seeks to the disk.

12. The method of claim 11, wherein during at least one of a scrub operation, a recovery operation, or a rebuild operation, the duplication information is used to skip at least one redundant and reduce a time taken to scrub, recover, or rebuild at least a portion of the disk array.

13. The method of claim 11, wherein during a recovery operation when a latent sector error (LSE) is present on both disks of a mirrored disk array, redundants are used to recover data stored in a sector experiencing the LSE.

14. The method of claim 11, wherein a write operation to a redundant results in the redundant being reclassified as a singlet until the singlet can be reevaluated to determine if the singlet constitutes a multiplet.

15. The method of claim 11, wherein selecting the proxy does not result in fragmenting a string of redundants and increasing the number of seeks.

16. A computer readable storage medium having stored thereon computer readable instructions, the computer readable instructions comprising instructions for:
    calculating a fingerprint for each data block written to a duplicate-aware disk array;
    storing the fingerprint for each data block along with a logical block number for each such data block in a tracker cache or a tracker log;
    determining at least a first set of multiplets based on the stored fingerprint calculated for each data block;
    selecting one multiplet to serve as a proxy for the first set of multiplets, and designating the remaining multiplets in the first set of multiplets as redundants; and
    using duplication information derived from selecting the proxy and designating the redundants to skip the redundants contained on the duplicate-aware disk array when executing one or more operations.

17. The computer readable storage medium of claim 16, wherein the one or more operations include at least one of a scrub operation, a recovery operation, or a rebuild operation, and further comprising instructions for skipping the redundants during the at least one of the scrub, recovery, or rebuild operations.

18. The computer readable storage medium of claim 16, further comprising instructions for rebuilding a data disk wherein redundants are skipped until at least singlets and proxies are recovered.

19. The computer readable storage medium of claim 16, further comprising instructions for remapping redundant data blocks to reduce seeks.

\* \* \* \* \*